United States Patent [19]
Cole

[11] 3,870,252
[45] Mar. 11, 1975

[54] VARIABLE CAMBER AIRFOIL TRAILING EDGE

[75] Inventor: James Byron Cole, Mercer Island, Wash.

[73] Assignee: The Boeing Company, Seattle, Wash.

[22] Filed: Mar. 9, 1973

[21] Appl. No.: 339,640

[52] U.S. Cl. .......................................... 244/42 CC
[51] Int. Cl. ............................................... B64c 9/08
[58] Field of Search ..................................... 244/42

[56] References Cited
UNITED STATES PATENTS

| | | | |
|---|---|---|---|
| 2,352,062 | 6/1944 | Zap | 244/42 DB |
| 2,352,074 | 6/1944 | Brown et al. | 244/42 DB |

FOREIGN PATENTS OR APPLICATIONS

| | | | |
|---|---|---|---|
| 697,606 | 9/1940 | Germany | 244/42 DB |
| 355,150 | 12/1937 | Italy | 244/42 DB |
| 344,066 | 10/1936 | Italy | 244/42 DB |

*Primary Examiner*—George E. A. Halvosa
*Assistant Examiner*—Jesus D. Sotelo
*Attorney, Agent, or Firm*—Christensen, O'Connor, Garrison & Havelka

[57] ABSTRACT

In present day aircraft, the wing normally has two or more airfoil segments chordwise thereof, and the segments are extendible and retractable in relation to one another so that the adjacent edges thereof open and close an aerodynamic slot therebetween. According to the invention, the trailing edge portion of the relatively forward segment has a resiliently bendably cantilevered rearwardly extending lip along the upper margin thereof, which in the normally relaxed position thereof coincides with the retracted position of the relatively aft segment, so that when the aft segment is extended, the lip causes the air moving over the upper side of the wing to impinge on the aft segment, but when the aft segment is retracted, it engages and deflects the lip into a faired condition with the upper side of the wing.

5 Claims, 2 Drawing Figures

VARIABLE CAMBER AIRFOIL TRAILING EDGE

THE INVENTION IN GENERAL

The invention provides a mechanism to assure that the air moving over the upper side of a slotted airfoil structure, such as a wing equipped with an extendible flap or flaps, will impinge on the leading edge portion of each flap as it passes over the aerodynamic slot or slots therein, and will therefore, effectively "reattach" to each flap as it progresses rearward of the wing.

Furthermore, the invention provides a mechanism of this nature which is adapted so that when the flaps are retracted, the operative surfaces of the airfoil structure are continuously uninterrupted and smoothly contoured in the chordwise direction thereof.

The invention also provides a mechanism of this nature which is simple in construction, inexpensive to include in the airfoil structure, and susceptible of long periods of service without undue maintenance.

Other objects and advantages will be apparent from the description of the invention which follows.

BRIEF DESCRIPTION OF THE DRAWING

The invention and its many ramifications will be best understood by reference to the accompanying drawing which illustrates a presently preferred embodiment of the same.

In the drawing.

DESCRIPTION OF THE PREFERRED EMBODIMENT

Figure 1:
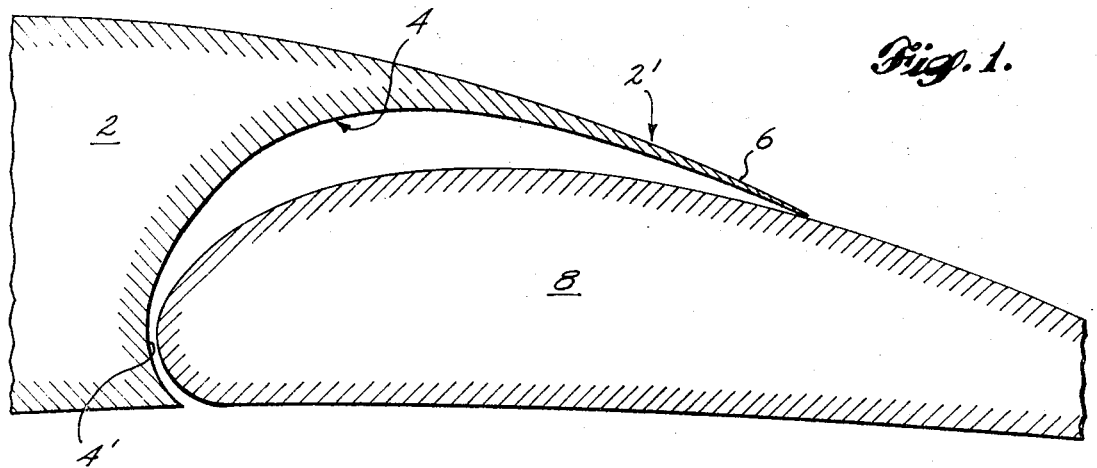
FIG. 1 is a part cross-sectional view of the trailing edge structure of an aircraft wing that is equipped with a trailing edge flap which is pivotably extendible and retractable in relation to the main airfoil of the wing, to vary the camber thereof, and which in this instance, is retracted in relation to the airfoil.
Figure 2:
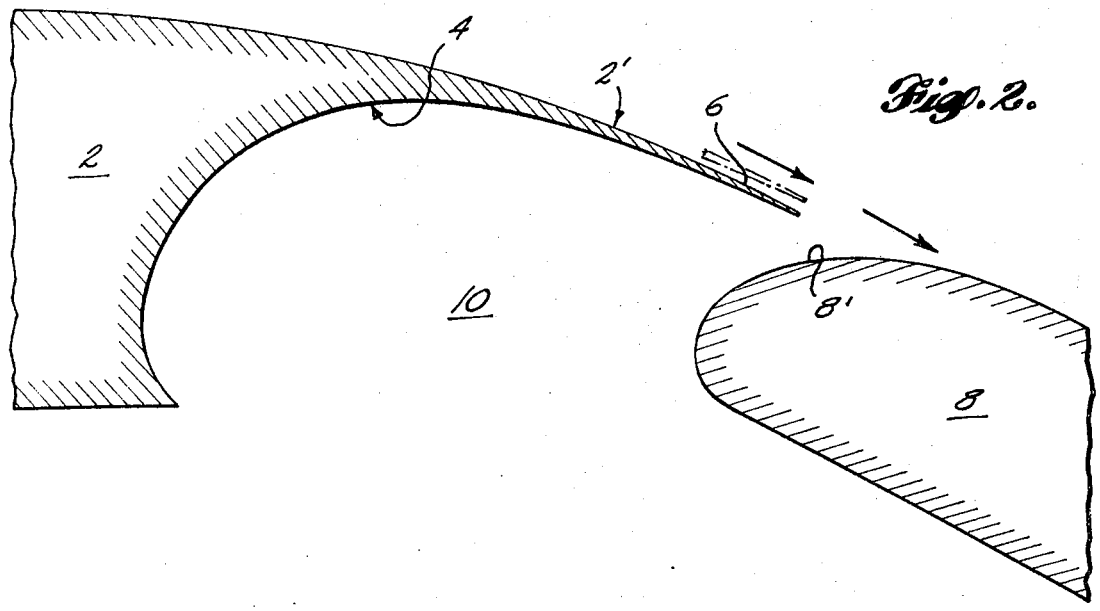
FIG. 2 is a similar view of the structure when the flap is extended in relation to the main airfoil.

Referring to the drawing, it will be seen that the trailing edge portion 2' of the main airfoil 2 has a recess 4 in the underside thereof forming a rearwardly extending lip 6 along the upper margin of the portion. The flap 8 is mounted adjacent the trailing edge portion of the airfoil to be extended rearwardly thereof, and thereby open a slot 10 between the flap and the airfoil, and alternately to be retracted into the recess and thereby extend the trailing edge contour of the airfoil. The lip 6 is resiliently bendably cantilevered from the airfoil so as to assume a normally relaxed position coinciding with the retracted position of the flap; and in this position, the lip causes the air moving over the upper side of the wing to impinge on the upper leading edge contour 8' of the flap, when the flap is pivotably extended in relation to the airfoil, as in FIG. 2. However, when the flap is pivotably retracted in relation to the airfoil, the upper leading edge contour of it engages and deflects the lip into a faired condition with the upper side of the wing, as in FIG. 1. Moreover, in the retracted position of the flap, the leading edge portion thereof nests in the recess, including within the swale or depression 4' formed by the reentrantly curved contour of the recess 4 at the lower forward end edge thereof.

What is claimed is:

1. An aircraft having a wing which has two or more airfoil segments chordwise thereof, the relatively forward of which segments has a resiliently bendable lip cantilevered from the main body thereof along the upper margin thereof, and the relatively aft of which segments is mounted to extend and retract in relation to the relatively forward segment, between (1) a relatively extended position wherein the relatively aft segment is spaced apart from the relatively forward segment, to form an aerodynamic slot therebetween, and (2) a relatively retracted position wherein the aft segment nests with the relatively forward segment to close the slot therebetween, said lip having a terminal edge portion and being cantilevered from the main body of the relatively forward segment so that (1) the relatively aft segment engages the lip in the relatively retracted position thereof and deflects the lip upward in relation to the main body of the relatively forward segment, to cause the lip to assume a relatively bent condition in which the upper side of the lip is faired into the contour of the upper side of the wing, and (2) the relatively aft segment disengages from the lip in the relatively extended position thereof and enables the lip to relax in relation to the main body of the relatively forward segment, to assume a relatively unbent condition in which the edge portion of the lip is spaced apart from the relatively aft segment to define the upper end of the slot therewith, and pointed across said upper end of the slot so that the contour of the upper side of the forward segment follows a smooth line of projection coinciding with the upper side of the lip and intersecting the body of the aft segment.

2. The aircraft according to claim 1 wherein the upper side of the aft segment has a convexly rounded contour at the leading edge thereof, and the lip is adapted to cause the moving air to impinge on the upper side of the aft segment, at the rounded leading edge contour thereof.

3. The aircraft according to claim 1 wherein the trailing edge portion of the forward segment has a recess in the underside thereof forming the lip, and the leading edge portion of the aft segment nests in the recess in the retracted position thereof.

4. The aircraft according to claim 3 wherein the recess has a concavely rounded contour.

5. The aircraft according to claim 4 wherein the contour of the recess curves reentrantly at the lower forward end edge thereof, to form a swale with which the underside of the leading edge portion of the aft segment nests in the retracted position thereof.

* * * * *